United States Patent
Binette et al.

(10) Patent No.: US 11,865,409 B2
(45) Date of Patent: Jan. 9, 2024

(54) GOLF BALL AND METHOD OF MAKING SAME

(71) Applicant: Acushnet Company, Fairhaven, MA (US)

(72) Inventors: Mark L. Binette, Mattapoisett, MA (US); Erin C. McDermott, Providence, RI (US); Michael J. Sullivan, Old Lyme, CT (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 17/710,925

(22) Filed: Mar. 31, 2022

(65) Prior Publication Data

US 2023/0310948 A1    Oct. 5, 2023

(51) Int. Cl.
*A63B 37/06*    (2006.01)
*A63B 37/00*    (2006.01)

(52) U.S. Cl.
CPC ...... *A63B 37/0051* (2013.01); *A63B 37/0039* (2013.01); *A63B 37/0074* (2013.01); *A63B 37/0075* (2013.01)

(58) Field of Classification Search
CPC ............ A63B 37/0051; A63B 37/0039; A63B 37/0024
See application file for complete search history.

(56) References Cited

U.S. PATENT DOCUMENTS

2013/0334737 A1* 12/2013 Wiegmans .......... B29C 45/2708
264/278

FOREIGN PATENT DOCUMENTS

| CA | 3074600 A1 | 3/2019 | |
|---|---|---|---|
| JP | 7000115 | * 7/1995 | ............ A63B 37/02 |
| WO | WO2018187238 | 10/2018 | |

OTHER PUBLICATIONS

ACS Nano; Highly Elastic Hydrated Cellulosic Materials With Durable Compressibility and Tunable Conductivity; Chaoji Chen, Jianwei Song, Jian Cheng, Zhenqian Pang, Wentao Gan, Gegu Chen, Yudi Kuang, Hao Huang, Upamanyu Ray, Teng Li and Liangbing Hu. 12 pages.

Advanced Sustainable Systems; vol. 5, Issue 5; Delignified Wood From Understanding the Hierachically Aligned Cellulosic Structures To Creating Novel Functional Materials; Anuj Kumar, Tuula Jyske, and Marko Petric; First published Mar. 7, 2021; 85 pages.

* cited by examiner

*Primary Examiner* — Raeann Gorden

(57) ABSTRACT

Golf ball comprising layer formed from polymer composition comprising delignified natural wood. The delignified natural wood may be basswood, oak, poplar, ash, alder, aspen, balsa wood, beech, birch, cherry, butternut, chestnut, cocobolo, elm, hickory, maple, oak, padauk, plum, walnut, willow, yellow poplar, bald cypress, cedar, cypress, fir, hemlock, larch, pine, redwood, spruce, tamarack, juniper, yew, and/or bamboo and having a lignin content of less than 20 wt %. Hemicellulose content may be less than 30 wt %, or about 15 wt % or less, or less than 15 wt %. The delignified natural wood is included in the polymer composition in an amount of 20 wt % or less, based on total weight of the polymer composition. Examples of polymer compositions include rubbers, polyurethanes, polyureas, ionomers, and combinations thereof. In specific embodiments, the golf ball core and/or intermediate layer is formed from the polymer composition. The delignified wood may comprise chopped wood pieces and/or powder.

4 Claims, No Drawings

GOLF BALL AND METHOD OF MAKING SAME

FIELD OF THE INVENTION

The field of the invention broadly comprises golf balls comprising polymer compositions demonstrating elasticity without sacrificing desired golf ball durability and playing characteristics.

BACKGROUND OF THE INVENTION

Today, both professional and amateur golfers alike use multi-piece, solid golf balls. A single or multi-layered core is encapsulated by at least one layer such as a single or multi-layered cover, and optionally one or more intermediate layers may be disposed there between to complete the golf ball construction.

Golf ball manufacturers pre-select the materials for each layer to target and impart desirable golf ball performance properties. Currently, a broad range of options are available for strategically incorporating and coordinating layers within each golf ball construction. In multi-layered golf balls, each of the core, intermediate layer and cover properties, such as hardness, compression, resilience, specific gravity, outer diameter, and thickness can be preselected and coordinated to target play characteristics such as spin, initial velocity and feel of the resulting golf ball.

Meanwhile, golf ball manufacturers seek to develop golf balls comprising polymer compositions demonstrating elasticity without sacrificing durability and other desirable playing characteristics.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY OF THE INVENTION

Accordingly, a golf ball of the invention comprises a layer formed from a polymer composition comprising delignified natural wood.

The delignified natural wood may be selected from basswoods, oaks, poplars, ashes, alders, aspens, balsa woods, beeches, birches, cherries, butternuts, chestnuts, cocobolos, elms, hickories, maples, oaks, padauks, plums, walnuts, willows, yellow poplars, bald cypresses, cedars, cypresses, firs, hemlocks, larches, pines, redwoods, spruces, tamaracks, junipers, yews, bamboo, and combinations thereof.

The delignified natural wood has a lignin content of less than 20 wt % and a hemicellulose content of 15 wt % or less. In a specific embodiment, the lignin content of the delignified natural wood is 15 wt % or less.

In a particular embodiment, the delignified natural wood is a powder.

The delignified natural wood may be included in the polymer composition in an amount of 20 wt % or less, based on the total weight of the polymer composition.

In one embodiment, the golf ball comprises a core and a cover, wherein the core is formed from the polymer composition, and wherein the polymer composition is selected from polybutadiene rubber, styrene-butadiene rubber, and blends thereof.

In another embodiment, the polymer composition is selected from polyurethanes, polyureas, ionomers, polyamides, polyesters, and combinations thereof, and combinations thereof.

In a specific embodiment, the golf ball comprises a core, a cover and an intermediate layer disposed between the core and the cover, wherein the intermediate layer is formed from the polymer composition.

DETAILED DESCRIPTION OF THE INVENTION

Golf balls of the invention incorporate at least one layer formed from a polymer composition comprising delignified natural wood. That is, the polymer composition incorporates natural wood wherein lignin, and in particular embodiments, hemicelluloses, is/are partially or fully removed. The cellulosic structure of the delignified wood imparts to the resulting golf ball elasticity yet high tensile strength without sacrificing durability.

Delignified Natural Wood Natural wood, prior to delignification, comprises an interconnected network of cellulose, lignin, and hemicelluloses. The cellulose portion of the wood is generally the framework of the wood and comprises a linear polymer chain of β-D-glucose molecules linked together by β-(1-4) glycosidic bonds.

Meanwhile, lignin is present in the wood cell wall, imparts stiffness and strength to the interconnected network, and is typically comprised of a phenylpropanoid polymer derived from three cinnamyl alcohols, namely p-coumaryl, coniferyl, and sinapyl alcohol. In turn, hemicellulose provides a link between the cellulose and the lignin, imparts flexibility and support in the interconnected network, and generally is comprised of a heteropolysaccharide comprising sugar units.

Prior to delignification, the natural wood has a cellulose content of about 40 wt %, a lignin content of about 20 wt %, and a hemicellulose content of about 15-30 wt %.

Examples of natural wood include basswoods, oaks, poplars, ashes, alders, aspens, balsa woods, beeches, birches, cherries, butternuts, chestnuts, cocobolos, elms, hickories, maples, oaks, padauks, plums, walnuts, willows, yellow poplars, bald cypresses, cedars, cypresses, firs, hemlocks, larches, pines, redwoods, spruces, tamaracks, junipers, yews, bamboo, etc.

In golf balls of the invention, the delignified natural wood has a lignin content of less than 20 wt % and a hemicellulose content of less than 30 wt %, or 15 wt % or less, or less than 15 wt %. In a specific embodiment of a golf ball of the invention, the lignin content of the delignified natural wood is 15 wt % or less.

Preferably, the delignified natural wood has a lignin content of less than 20 wt %. In one embodiment, the delignified wood has a lignin content of from 3 wt % to less than 20 wt %. In another embodiment, the delignified wood has a lignin content of from 3 wt % to 15 wt %. In yet another embodiment, the delignified wood has a lignin content of from 3 wt % to 10 wt %. In still another embodiment, the delignified wood has a lignin content of from 3 wt % to 5 wt %. In alternative embodiments, the delignified wood has a lignin content of up to 5 wt %, or from 5 wt % to less than 20 wt %, or from 5 wt % to 15 wt %, or from 5 wt % to 10 wt %, or from 10 wt % to less than 20 wt %, or from 10 wt % to 15 wt %, or from 15 wt % to less than 20 wt %.

Meanwhile, in a specific embodiment, the delignified natural wood has a hemicellulose content of less than 15 wt %. In one embodiment, the delignified wood has a hemicellulose content of from 3 wt % to less than 15 wt %. In another embodiment, the delignified wood has a hemicellulose content of from 3 wt % to 10 wt %. In yet another embodiment, the delignified wood has a hemicellulose content of from 3 wt % to 5 wt %. In still another embodiment, the delignified wood has a hemicellulose content of up to 5 wt %. In alternative embodiments, the delignified wood has a hemicellulose content of from 5 wt % to less than 30 wt %, from 5 wt % to less than 20 wt %, or from 5 wt % to 15 wt %, or from 5 wt % to 10 wt %, or from 10 wt % to less than 30 wt %, or from 10 wt % to less than 20 wt %, or from 10 wt % to 15 wt %, or from 15 wt % to less than 30 wt %, or from 15 wt % to less than 20 wt %.

Preferably, the delignified wood is included in the polymer composition in an amount of 20 wt % or less, based on the total weight of the polymer composition. In one embodiment, the delignified wood is included in the polymer composition in an amount of from 3 wt % to 20 wt % based on the total weight of the polymer composition. In another embodiment, the delignified wood is included in the polymer composition in an amount of from 3 wt % to 15 wt % based on the total weight of the polymer composition. In yet another embodiment, the delignified wood is included in the polymer composition in an amount of from 3 wt % to 10 wt % based on the total weight of the polymer composition. In still another embodiment, the delignified wood is included in the polymer composition in an amount of from 3 wt % to 5 wt % based on the total weight of the polymer composition. In alternative embodiments, the delignified wood is included in the polymer composition in an amount of up to 5 wt %, based on the total weight of the polymer composition, or from 5 wt % to 20 wt % based on the total weight of the polymer composition, or from 5 wt % to 15 wt % based on the total weight of the polymer composition, or from 5 wt % to 10 wt % based on the total weight of the polymer composition, or from 10 wt % to 20 wt % based on the total weight of the polymer composition, or from 10 wt % to 15 wt % based on the total weight of the polymer composition, or from 15 wt % to 20 wt % based on the total weight of the polymer composition.

The delignified natural wood may be chopped, cut, ground or otherwise reduced into a plurality of segments and/or particulates ("segments/particulates") having predetermined sizes and included in the polymer composition in an amount sufficient to target desired golf ball properties.

In this regard, the amount as well as the total surface area of the delignified wood included in the polymer composition can impact the properties imparted to the resulting layer. Total surface area of the segments/particulates can be predetermined by pre-selecting the size(s) of each of the plurality of delignified wood segments or particulates included in the polymer composition.

Generally, chopping up or otherwise dividing a given volume of delignified wood into a greater number smaller segments/particulates produces a larger combined surface area of delignified wood than chopping up the given volume of delignified wood into a fewer number of larger segments/particulates. In some embodiments, a greater number of smaller segments/particulates is preferred, whereas in other embodiments, a fewer number of larger segments/particulates may be preferred. Embodiments are also envisioned wherein a combination of both smaller segments/particulates and larger segments/particulates are included in the polymer composition in various relative proportions.

Thus, a given polymer composition may comprise a first plurality of delignified wood segments/particulates and a second plurality of delignified wood segments/particulates, wherein the first plurality and second plurality differ as to natural wood type, natural wood segment/particulate size, type of delignification process used to delignify the natural wood, or regarding the amount or proportion of each being added into the polymer composition to target a layer/golf ball property.

Property gradients such as differences in specific gravity, elasticity, hardness, modulus, etc can be created between the first plurality of delignified wood and the second plurality of delignified wood in the given layer.

In other embodiments, property gradients can be created between two given layers, such as wherein one of two given layers contains delignified wood while the second layer does not contain any delignified wood. In one such embodiment, a first layer comprises a first polymer composition comprising delignified wood and a second layer comprising the first polymer composition except without containing any delignified wood. In this embodiment, the first layer comprising the first polymer composition has a specific gravity of less than 1.0, while the second layer comprising the first polymer composition without any delignified wood has a specific gravity of greater than 1.0, yet the finished golf ball has a coefficient of restitution (CoR) of at least 0.800.

Unlike conventional specific gravity reducing fillers, additives, etc., the delignified wood can be added in an amount sufficient to reduce the specific gravity of the material, layer and therefore resulting golf ball without meanwhile negatively impacting the elasticity of the material, layer and golf ball.

In a particular embodiment, the delignified natural wood is a powder. In another embodiment, the delignified wood comprises a plurality of chopped, sliced or otherwise divided segments of delignified wood.

The natural wood may be delignified using any known delignification process; however, in a preferred embodiment, delignification occurs via treating the natural wood as set forth in Kuang, Yudi; Huang, Hao; Ray, Upamanyu; Li, Teng; and Hu, Liangbing; "Highly Elastic Hydrated Cellulosic materials with Durable Compressibility and Tunable Conductivity"; ACS Nano; Vol. 14; Issue 12; Jul. 27, 2020; pp. 16723-16734 ("Kuang et al."), hereby incorporated by reference herein in its entirety.

Kuang et al. chemically treats the natural wood using a boiling mixed solution of Sodium Hydroxide(NaOH)/Sodium Sulfite($Na_2SO_3$) followed by a freeze-drying process. In particular, a block of natural wood may be: i) immersed in a mixture solution of sodium hydroxide (NaOH, 2.5 M) and sodium sulfite ($Na_2SO_3$, 0.4 M) and soaked for 3-7 hours, depending on the size of the wood blocks, at about 100° C.; ii) immersed in deionized water to remove the chemicals; iii) placed in a refrigerator and frozen at −10° C. to −20° C. for 1-2 days; and iv) placed in a freeze drier for 1 day. See Kuang et al. @p. 1631 (also identified as page "I" of pages "A-L").

Treating the natural wood in solutions of sodium hydroxide and sodium sulfite, which chemically breaks down/deteriorates the long molecular chains of lignin and hemicellulose and rigid structure of the natural wood to create thinner walls and a gel network imparting elastic properties to the natural wood in the resulting delignified wood following treatment.

Subsequently, the wood block may be chopped, sliced or otherwise divided into a plurality of subdivided pieces of the wood and included in the polymer composition as desired to target properties of the golf ball layer and resulting golf ball incorporating same.

It is envisioned that other treatment methods may be applied to create the delignified wood incorporated in a golf ball of the invention in order to produce differing delignified wood having contrasting properties. Examples of suitable treatments are set forth in Kumar, Anuj, Jyske, Tuula, Petrič, Marko; "Delignified Wood from Understanding the Hierarchically Aligned Cellulosic Structures to Creating Novel Functional Materials: A Review"; Advanced Sustainable Systems; Vol. 5, Issue 5, Mar. 7, 2021 ("Kumar et al."), hereby incorporated by reference herein in its entirety.

Polymer Composition

Preferably, the polymer composition is selected from rubbers, polyurethanes, polyureas, ionomers, polyamides, polyesters, and combinations thereof, although it is envisioned that the delignified wood may be incorporated in any known golf ball polymer composition.

Rubber Polymer Compositions

In one embodiment, the polymer composition may be a rubber.

In one particular embodiment, the polymer composition is selected from polybutadiene rubber, styrene-butadiene rubber, and blends thereof.

In particular embodiments, the base rubber is selected from the group consisting of: natural rubber, polybutadiene, polyisoprene, ethylene propylene rubber, ethylene-propylene-diene rubber, styrene-butadiene rubber, butyl rubber, halobutyl rubber, polyurethane rubber, polyurea rubber, acrylonitrile butadiene rubber, polychloroprene, alkyl acrylate rubber, chlorinated isoprene rubber, acrylonitrile chlorinated isoprene rubber, polyalkenamer, and combinations thereof.

In a preferred embodiment, the base rubber is polybutadiene. In general, polybutadiene is a homopolymer of 1, 3-butadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst.

Other catalysts include, but are not limited to, aluminum, boron, lithium, titanium, or combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Michigan; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pennsylvania; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P3OAF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

The rubber compositions of this invention may be cured, either by pre-blending or post-blending, using conventional curing processes. Suitable curing processes include, for example, peroxide-curing, sulfur-curing, high-energy radiation, or combinations thereof. Preferably, the rubber composition contains a free-radical initiator selected from organic peroxides, high energy radiation sources capable of generating free-radicals, or combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; or combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the base rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; or combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Free radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, or combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), or combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 parts by weight or less, or 12 parts by weight or less, or 10 parts by weight or less, or 9 parts by weight or less, or 6 parts by weight or less, or 5 parts by weight or less, or 4 parts by weight or less, or 3 parts by weight or less, per 100 parts of the base rubber.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

Polyurethane Polymer Compositions

In one embodiment, the polymer composition may be a polyurethane. In general, polyurethanes contain urethane linkages formed by reacting an isocyanate group (—N=C=O) with a hydroxyl group (OH). The polyurethanes are produced by the reaction of a multi-functional isocyanate (NCO—R—NCO) with a long-chain polyol having terminal hydroxyl groups (OH OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled.

Thermoplastic polyurethanes are therefore particularly desirable as an outer cover layer material. Non-limiting examples of suitable thermoplastic polyurethanes include TPUs sold under the tradenames of Texin® 250, Texin® 255, Texin® 260, Texin® 270, Texin®950U, Texin® 970U, Texin®1049, Texin®990DP7-1191, Texin® DP7-1202, Texin®990R, Texin®993, Texin® DP7-1049, Texin® 3203, Texin® 4203, Texin® 4206, Texin® 4210, Texin® 4215, and Texin® 3215, each commercially available from Covestro LLC, Pittsburgh PA; Estane® 50 DT3, Estane®58212, Estane®55DT3, Estane®58887, Estane® EZ14-23A, Estane® ETE 50DT3, each commercially available from Lubrizol Company of Cleveland, Ohio; and Elastollan® WY1149, Elastollan®1154D53, Elastollan®1180A, Elastollan®1190A, Elastollan®1195A, Elastollan®1185AW, Elastollan®1175AW, each commercially available from BASF; Desmopan® 453, commercially available from Bayer of Pittsburgh, PA, and the E-Series TPUs, such as D 60 E 4024 commercially available from Huntsman Polyurethanes of Germany.

On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multi-functional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

In one embodiment, the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00.

In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as known in the golf ball art. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio.

A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; mono-ethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 2, 2'-(1,4-phenylenedioxy)diethanol, 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,T,6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene). The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

In addition, the polyurethane compositions may contain fillers, additives, and other ingredients that do not detract from the properties of the final composition. These additional materials include, but are not limited to, catalysts, wetting agents, coloring agents, optical brighteners, crosslinking agents, whitening agents such as titanium dioxide and zinc oxide, ultraviolet (UV) light absorbers, hindered amine light stabilizers, defoaming agents, processing aids, surfactants, and other conventional additives.

Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Ionomer Polymer Compositions

Suitable ionomers include O/X, E/X, O/X/Y, and E/X/Y-type copolymers that are at least partially neutralized with one or more cation(s), optionally in the presence of an organic acid, such as disclosed in U.S. Pat. No. 6,756,436, the entire disclosure of which is hereby incorporated herein by reference. Specifically, O is an α-olefin, E is ethylene, X is a $C_3$-$C_8$ α,β-ethylenically unsaturated carboxylic acid, and Y is a softening monomer.

The term, "copolymer," as used herein, includes polymers having two types of monomers, those having three types of monomers, and those having more than three types of monomers.

A partially neutralized ionomer has about 70 percent or less of acid groups present neutralized by at least one cation, while a highly neutralized polymer (HNP) has greater than about 70 percent of acid groups present neutralized by the cation (s), and embodiments are even envisioned wherein an excess amount of cation is included in addition to that sufficient to neutralized 100% of the acid groups present.

Suitable cations include, but are not limited to, metal ion sources, such as compounds of alkali metals, alkaline earth metals, transition metals, and rare earth elements; ammonium salts and monoamine salts; or combinations thereof. Preferred cations include for example compounds of magnesium, sodium, potassium, cesium, calcium, barium, manganese, copper, zinc, lead, tin, aluminum, nickel, chromium, lithium, rare earth metals, or combinations thereof.

The "O" is preferably selected from ethylene and propylene. Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/isobutyl (meth)acrylate, ethylene/(meth)acrylic acid/methyl (meth)acrylate, ethylene/(meth) acrylic acid/ethyl (meth)acrylate terpolymers, and the like.

The acid copolymer can be reacted with the optional high molecular weight organic acid and the cation(s) simultaneously, or prior to the addition of the cation(s).

In some embodiments, X is preferably selected from methacrylic acid, acrylic acid, ethacrylic acid, crotonic acid, and itaconic acid. Methacrylic acid and acrylic acid are particularly preferred. In turn, Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Some preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. Some more preferred E/X/Y-type copolymers are ethylene/(meth) acrylic acid/n-butyl acrylate, ethylene/(meth) acrylic acid/ methyl acrylate, and ethylene/(meth) acrylic acid/ethyl acrylate.

As used herein, "(meth) acrylic acid" means methacrylic acid and/or acrylic acid. Likewise, "(meth) acrylate" means methacrylate and/or acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer.

"Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

Ionomers may encompass those polymers obtained by copolymerization of an acidic or basic monomer, such as (meth)acrylic acid, with at least one other comonomer, such as an olefin, styrene or vinyl acetate, followed by at least partial neutralization. Alternatively, acidic or basic groups may be incorporated into a polymer to form an ionomer by reacting the polymer, such as polystyrene or a polystyrene copolymer including a block copolymer of polystyrene, with a functionality reagent, such as a carboxylic acid or sulfonic acid, followed by at least partial neutralization. Suitable neutralizing sources include cations for negatively charged acidic groups and anions for positively charged basic groups.

Non-limiting examples of commercially available ionomers suitable for use with the present invention include for example SURLYN® ionomers from DuPont and Iotek® ionomers from Exxon. In this regard, examples of SURLYN® ionomers include SURLYN®7940(Li), SURLYN® 8940 (Na) and SURLYN® 9650 (Zn), which are medium acid ionomer resins; and SURLYN® 9910 (Zn), a low acid ionomer resin. Additional examples of suitable low acid ionomers include Escor® 4000/7030 and Escor® 900/8000, disclosed in U.S. Pat. Nos. 4,911,451 and 4,884,814, the disclosures of which are incorporated by reference herein. Meanwhile, examples of high acid ionomer resins include SURLYN® 8140 (Na), SURLYN®9150 (Zn) and SURLYN® 8546 (Li). The acid groups of the low, medium and high acid ionomer resins have been neutralized to a certain degree with the designated cation.

In a particular embodiment, ionomers may be selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company.

Suitable HNPs include, but are not limited to, polymers containing α,β-unsaturated carboxylic acid groups, or the salts thereof, that have been highly neutralized by organic fatty acids. Such HNPs are commercially available from DuPont under the trade name HPF, e.g., HPF 1000 and HPF 2000. The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound.

In addition, the HNP can be formed from an acid copolymer that is neutralized by one or more amine-based or ammonium-based components, or mixtures thereof, as disclosed in U.S. Pat. No. 7,160,954 entitled "Golf Ball Compositions Neutralized with Ammonium-Based and Amine-Based Compounds," which is incorporated in its entirety by reference herein.

An acid copolymer that is partially or highly neutralized in a manner described above may be subjected to additional neutralization using more traditional processes, e.g., neutralization with salts of organic fatty acids and/or a suitable cation(s).

Polyurea and Polyurea/Polyurethane Hybrid Polymer Compositions

In general, polyurea compositions contain urea linkages formed by reacting an isocyanate group (—N═C═O) with an amine group (NH or NH$_2$). The chain length of the polyurea prepolymer is extended by reacting the prepolymer with an amine curing agent. The resulting polyurea has elastomeric properties, because of its "hard" and "soft" segments, which are covalently bonded together. The soft, amorphous, low-melting point segments, which are formed from the polyamines, are relatively flexible and mobile, while the hard, high-melting point segments, which are formed from the isocyanate and chain extenders, are relatively stiff and immobile. The phase separation of the hard and soft segments provides the polyurea with its elastomeric resiliency. The polyurea composition contains urea linkages having the following general structure:

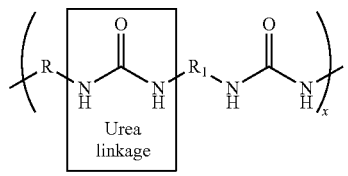

Urea linkage

A polyurea/polyurethane hybrid composition is produced when the polyurea prepolymer (as described above) is chain-extended using a hydroxyl-terminated curing agent. Any excess isocyanate groups in the prepolymer will react with the hydroxyl groups in the curing agent and create urethane linkages. That is, a polyurea/polyurethane hybrid composition is produced.

In a preferred embodiment, a pure polyurea composition, as described above, is prepared. That is, the composition contains only urea linkages. An amine-terminated curing agent is used in the reaction to produce the pure polyurea composition. However, it should be understood that a polyurea/polyurethane hybrid composition also may be prepared in accordance with this invention as discussed above. Such a hybrid composition can be formed if the polyurea prepolymer is cured with a hydroxyl-terminated curing agent. Any excess isocyanate in the polyurea prepolymer reacts with the hydroxyl groups in the curing agent and forms urethane linkages. The resulting polyurea/polyurethane hybrid composition contains both urea and urethane linkages. The general structure of a urethane linkage is shown below:

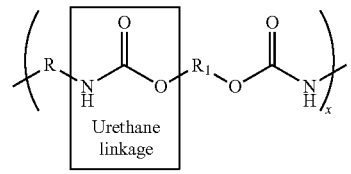

Urethane linkage

More particularly, in one preferred version, the polymer matrix consists of 100% by weight of the polyurea or polyurea/urethane composition of this invention. In another version, the polymer matrix comprises a polymeric blend. The polyureas or polyurea/urethanes of this invention may be blended with non-ionomeric polymers to form the composition that will be used to make a layer of a golf ball of the invention. Examples of non-ionomeric polymers include vinyl resins, polyolefins including those produced using a single-site catalyst or a metallocene catalyst, polyurethanes, polyureas, polyamides, polyphenylenes, polycarbonates, polyesters, polyacrylates, engineering thermoplastics, and the like. The blend may contain about to about 90% by weight of the polyurea or polyurea/urethane and about 90 to about 10% by weight of a non-ionomeric polymer.

In yet another version, the polyureas or polyurea/urethanes are blended with olefin-based ionomers, such as ethylene-based ionic copolymers, which normally include an unsaturated carboxylic acid, such as methacrylic acid, acrylic acid, or maleic acid. Other possible carboxylic acid groups include, for example, crotonic, maleic, fumaric, and itaconic acid. Low acid and high acid olefin-based ionomers, as well as blends of such ionomers, may be used. The acidic group in the olefin-based ionic copolymer is partially or totally neutralized with metal ions such as zinc, sodium, lithium, magnesium, potassium, calcium, manganese, nickel, chromium, copper, or a combination thereof. For example, ionomeric resins having carboxylic acid groups that are neutralized from about 10 percent to about 100 percent may be used. In one embodiment, the neutralization level is from 10 to 80%, more preferably 20 to 70%, and most preferably 30 to 50%. In another embodiment, the neutralization level is from 80 to 100%, more preferably 90 to 100%, and most preferably 95 to 100%. The blend may contain about 10 to about 90% by weight of the polyurea or polyurea/urethane and about 90 to about 10% by weight of a partially, highly, or fully-neutralized olefin-based ionomeric copolymer.

The polyurea and polyurea/urethane compositions making up layers of golf balls of the invention may contain additives, ingredients, and other materials that do not detract from the properties of the final composition. These additional materials include, but are not limited to, catalysts, wetting agents, coloring agents, optical brighteners, crosslinking agents, whitening agents such as titanium dioxide and zinc oxide, UV light absorbers, hindered amine light stabilizers, defoaming agents, processing aids, surfactants, and other conventional additives. For example, wetting additives may be added to more effectively disperse the pigments. Other suitable additives include antioxidants, stabilizers, softening agents, plasticizers, including internal and external plasticizers, impact modifiers, foaming agents, density-adjusting fillers, reinforcing materials, compatibilizers, and the like. Density-adjusting fillers can be added to modify the modulus, tensile strength, and other properties of the compositions. Examples of useful fillers include zinc oxide, zinc sulfate, barium carbonate, barium sulfate, calcium oxide, calcium carbonate, clay, tungsten, tungsten carbide, silica, and mixtures thereof. Regrind (recycled core material) high-Mooney-viscosity rubber regrind, and polymeric, ceramic, metal, and glass microspheres also may be used. Generally, the additives will be present in the composition in an amount between about 1 and about 70 weight percent based on the total weight of the composition depending upon the desired properties.

Examples of Golf Ball Constructions

Golf balls of the present invention may contain any number of layers comprising any known composition, may have any known dimensions and may possess any known golf properties, dimple count and/or dimple construction so long as at least one layer and/or coating of the golf ball is formed from a polymer composition comprising delignified wood.

For example, in one embodiment, the golf ball comprises a core and a cover, wherein the core is formed from the polymer composition comprising delignified wood.

In another embodiment, the golf ball comprises a core, a cover and an intermediate layer disposed between the core and the cover, wherein the intermediate layer is formed from the polymer composition comprising delignified wood.

Embodiments are envisioned wherein a golf ball of the invention includes two or more layers, wherein each of at least two of the two or more layers are each formed from a polymer composition of the invention comprising delignified natural wood. For example, a first layer may be formed from a first rubber composition comprising one or more first delignified natural wood, while a second layer is formed from a second rubber composition that differs from the first rubber composition at least with respect to the pre-selected delignified natural wood or amount thereof. In this embodiment, the first and second rubber compositions may be otherwise identical or may differ in some additional respect such as type or amount of base rubber, coagent, antioxidant, etc.

In other embodiments, a first layer may be formed from a rubber composition comprising one or more first delignified natural wood, while a second layer is formed from a polyurethane, ionomer, polyurea, etc., composition comprising one or more second delignified natural wood. In such embodiments, the first delignified natural wood and the second delignified natural wood may be the same or at least partially differ.

Meanwhile, the at least two layers may be adjacent to each other or may be separated by at least a third layer disposed between the at least two layers, wherein the third layer does not incorporate delignified natural wood.

It is also contemplated that compositions comprising other polymers, such as latexes, lacquers, enamels, acrylics, epoxies, polyesters, urethane acrylates, polyester acrylates, alkyds, polyurethane-polyurea hybrids, etc. may comprise delignified natural wood. In such embodiments, the delignified natural wood is included in the composition in an amount of up to about 20 wt % based on the total weight of the composition.

Golf balls of the invention may include conventional colorants and/or color effects in any layer and/or indicia. Conventional colorants include for example, chromophore-based pigments, dyes, tints, inks, etc. which absorb light selectively within wavelengths of visible light as well as non-chromophore-based coloring agents such as structured colorants, wherein color is produced based on the light scattering properties of a photonic pigmented layer incorporating photonic pigments.

Conventional logo(s) and/or other print such as UV print may also or alternatively be provided on any layer surface of a golf ball of the invention.

Golf ball layers may also include conventional backer pigments and/or color effects such as but not limited to luster pigments, interference pigments and/or pearlescent pigments, non-limiting examples of which are disclosed in U.S. Pat. No. 8,119,735 of Hebert et al; U.S. Pat. No. 9,205,304 of Hogge et al.; U.S. Pat. No. 10,035,043 of Hogge et al.; and/or U.S. Publication No. 2012/0021851 of Hogge, each of which is hereby incorporated by reference herein in its entirety.

It is also envisioned that conventional optical brighteners, UV absorbers, quenchers, free radical scavengers, and antioxidants can be incorporated in golf ball layers as desired.

In this regard, non-limiting examples of suitable core diameters range from less than 0.5 inches up to about 1.8 inches or greater.

Non-limiting examples of suitable non-coating layer thicknesses range from 0.005 inches to about 0.750 inches.

Non-limiting examples of suitable coating layer thicknesses range from 0.1 mil to 35.0 mils, or from 0.1 mil to 15.0 mils, or from 0.1 mil to 10.0 mils, or from 0.1 mil to 5.0 mils, or from 0.1 mil to 3.0 mils.

Layers of golf balls of the invention may have various hardnesses and hardness gradients as known in the golf ball art depending on the particular golf ball playing characteristics being targeted. Non-limiting examples of suitable hardness ranges include from 35 Shore C to about 98 Shore C, or 50 Shore C to about 90 Shore C, or 60 Shore C to about 85 Shore C, or 45 Shore C to about 75 Shore C, or 40 Shore C to about 85 Shore C, or from about 20 Shore D to about 90 Shore D, or from about 30 Shore D to about 60 Shore D, or from about 40 Shore D to about 50 Shore D, or 50 Shore D or less, or greater than 50 Shore D.

Of course, advantageously, a resulting golf ball of the invention created using the method of the invention may have any known hardness gradient and in any known hardness scale in the golf ball art such as Shore C, Shore D, Shore M, etc.

Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed.

Gradient-producing processes and formulations are disclosed more fully, for example, in U.S. Pat. Nos. 7,678,312; 7,537,530; 7,537,529; 7,429,221; and 7,410,429; the entire disclosures of which are hereby incorporated herein by reference.

Test Methods

Hardness

The center hardness of a core may be obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result.

The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches.

Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Coefficient of Restitution

Golf balls of the invention and the materials of layers thereof may have a Coefficient of Restitution (CoR) of at least 0.700, or 0.750 or greater, or at least 0.800. CoR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity.

As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens.

As the rebounding ball activates each light screen, the ball's time period at each screen is measured. This provides an outgoing transit time period which is inversely proportional to the ball's outgoing velocity.

The CoR is then calculated as the ratio of the ball's outgoing transit time period to the ball's incoming transit time period (COR=$V_{out}/V_{in}=T_{in}/T_{out}$).

Flexural Modulus

Moreover, the flexural modulus of the inventive polymer composition comprising delignified natural wood is tailored and confirmed using ASTM D790. In some embodiments, the thermoset or thermoplastic composition may have a relatively low modulus with a lower limit of 1,000 or 5,000 or 10,000 or 15,000 or 20,000 or 25,000 or 30,000 psi and an upper limit of 40,000 or 45,000 or 50,000 or 60,000 or 70,000 or 80,000. The hardness of the low modulus material is generally 30 Shore D or greater; or 40 Shore D or greater; or 50 Shore D or greater, or preferably within a range having a lower limit of 30 or 40 or 50 Shore D and an upper limit of 60 or 70 or 80 or 85 Shore D.

Furthermore, the inventive polymer composition comprising delignified natural wood may be tailored to have a relatively high modulus within the range having a lower limit of 90,000 or 100,000 or 110,000 or 120,000 or 130,000 or 140,000 or 150,000 psi and an upper limit of 200,000 or 300,000 or 400,000 or 500,000 or greater and a hardness of 40 Shore D or greater, or 50 Shore D or greater, or 60 Shore D or greater, or within a range having a lower limit of 40 or 50 or 60 Shore D and an upper limit of 80 or 90 or 100 Shore D.

Tensile Strength

Meanwhile, the inventive polymer composition comprising delignified natural wood may be tailored to have a suitable tensile strength. Non-limiting examples of suitable such tensile strengths include at least 500 psi, at least 1,000 psi, at least 2,000 psi, at least 5,000 psi, at least 6,000 psi, at least 7,000 psi, at least 8,000 psi, or at least 10,000 psi.

Tensile Strength(psi) may be measured using ASTM D638.

Elongation at Break

Additionally, the inventive polymer composition comprising delignified natural wood may be tailored to have a suitable elongation at break.

Non-limiting examples of suitable elongation at breaks include 10% to 200%, about 20 to 1000%, at least 25%, or at least about 50%, or at least 100%, or 200% or greater, or 300% or greater, or at least about 400% to about 800%.

Elongation at break (%) may be measured using ASTM D638.

Izod Impact Strength

The inventive polymer composition comprising delignified natural wood may also be tailored to have a suitable Izod impact strength. Non-limiting examples of suitable such Izod impact strengths include greater than 0.90 ft.lb./in., at least 1.0 ft.lb./in., greater than 1.0 ft.lb./in., or at least 2.0 ft.lb./in.

Izod impact strength may be measured using Izod Impact Test (ft.lb./in.) ASTM D256.

Specific Gravity

Additionally, the inventive polymer composition comprising delignified natural wood may be tailored to have a targeted specific gravity or targeted range of specific gravities.

As used herein, the term specific gravity refers to the ratio of a material's density with that of water at 4° C. (where it is most dense and is taken to have the value of 999.974 kg m$^{-3}$. It is a relative quantity with no units.

Specific gravity may be measured using ASTM D297 (generally rubbers) or ASTM D792 (generally plastics).

Embodiments are envisioned wherein: i) the specific gravity of a given golf ball layer/material is consistent throughout; or the specific gravity of a given golf ball layer/material varies throughout the material/layer.

Examples of suitable specific gravities are within a range having a lower limit of about 0.50 or 0.60 or 0.70 or 0.75 or 0.85 or 0.90 or 0.95 or 1.00 or 1.10 or 1.25 or 1.30 or 1.36 or 1.40 or 1.42 or 1.48 or 1.50 or 1.60 or 1.66 or 1.75 or 2.00 and an upper limit of 2.50 or 2.60 or 2.80 or 2.90 or 3.00 or 3.10 or 3.25 or 3.50 or 3.60 or 3.80 or 4.00, 4.25 or 5.00 or 5.10 or 5.20 or 5.30 or 5.40 or 6.00 or 6.20 or 6.25 or 6.30 or 6.40 or 6.50 or 7.00 or 7.10 or 7.25 or 7.50 or 7.60 or 7.65 or 7.80 or 8.00 or 8.20 or 8.50 or 9.00 or 9.75 or 10.00.

Durability Testing

Impact Durability Testing

Impact durability of a golf ball of the invention can be evaluated by striking at least twelve identical inventive golf balls 200 times using a Titleist-made Rotating Pendulum Testing Machine. The machine is configured to strike/hit golf balls repeatedly with a grooved-metal face-plate, rotating at 1100 rpm, that is positioned 13.5 inches from the drive motor and angled at approximately 13 degrees. An assessment of failure is made every 50 hits using a black light to monitor when/if the failure began to occur on the surface of the golf ball.

Impact durability can also be evaluated by striking at least twelve identical inventive golf balls 200 times using the Titleist-made Rotating Pendulum Testing Machine followed by performing a Graphite Rub Test, wherein pencil graphite shavings are rubbed on the surface of each golf ball and then observation is made as to evidence of cracks/spider webbing, ridges, bumps, holes or tears occurring on the golf ball surface.

Golf balls having a core/layer formed from a polymer composition comprising delignified natural wood according to the present invention preferably do not exhibit failure, cracks/spider webbing, ridges, bumps, holes or tears.

Delamination

The durability of a resulting golf ball of the invention incorporating a polymer composition comprising delignified natural wood can be demonstrated by evaluating the golf ball for delamination. As used herein, "delamination" refers to a condition wherein the material of a given layer fractures into multiple layers which "onion-skin" or peel off.

Such delamination can typically be observed visually and can be confirmed through a simple manual test wherein a knife blade is used to "peel" the layer being assessed, thereby exposing the fracturing of the layer material. Layer separation may be visually apparent as "bubbling" or air pockets between the two layers.

Delamination detrimentally affects not only the appearance of the golf ball but playability as well.

Golf balls incorporating a layer formed from a polymer composition comprising delignified natural wood according to the present invention preferably do not exhibit delamination.

Peel Strength

Meanwhile, the peel strength of a layer formed from a polymer composition comprising delignified natural wood with respect to an adjacent layer may be evaluated by performing a Peel Test. In particular, a strip of approximately ½ inch is cut around an equator of the golf ball, deep enough to cut through the entire layer to be tested. Next, a perpendicular cut is made across the strip and one end of the strip peeled back just enough to make a tab of about ½ inch. The ball is then clamped into a jig by poles with the tab facing upward. The jig allows the clamped ball to freely rotate about an axis parallel to the poles. The tab is then clamped to a 20 lb. load cell of a universal testing machine. The tab is pulled away from the ball at a rate of 0.5 in./min., and the force required to pull the outer layer off of the underlying layer is recorded.

Golf balls incorporating layer formed from a polymer composition comprising delignified natural wood according to the present invention preferably exhibit a peel strength of at least 15 lbs./in.

Additional examples of other suitable golf ball compositions, dimensions, golf properties methods for measuring properties of golf balls of the invention and methods for making golf balls of the invention are disclosed in the following co-owned patents/publications, each of which is hereby incorporated by reference herein in its entirety: U.S. Pat. Nos. 11,040,250, 10,933,285, 10,596,419, 10,016,659, 10,661,123, 10,967,225, 10,821,327, 10,252,113, 10,918,912, 10,814,180, 10,773,129, 10,682,553, 10,500,444, 10,500,443, 10,427,004, 10,119,008, 10,105,576, 10,105,575, 10,933,285, 10,933,285, 10,933,285, 10,933,285, 10,933,285, 9,095,748, 10,428,216 and U.S. Publ. No. 2021/0094209.

Furthermore, golf ball layers may be applied or molded using any known suitable process for forming a given polymer composition into a given layer such as an inner core, an intermediate layer (e.g., outer core layer, casing layer, inner cover layer, film layer, moisture barrier layer), outer cover, and/or coating layer. Non-limiting of examples of suitable processes include compression molding, flip molding, injection molding, retractable pin injection molding, reaction injection molding (RIM), liquid injection molding (LIM), casting, vacuum forming, thermoforming, particle coating, flow coating, spin coating, dipping, spraying, and the like. Conventionally, compression molding and injection molding are applied to thermoplastic materials, whereas RIM, liquid injection molding, and casting are employed on thermoset materials.

For each embodiment of a golf ball and/or method of the invention disclosed herein, alternative embodiments are indeed also envisioned wherein "comprises" (e.g., "comprise", "comprised of", "comprising", etc.) may be replaced with "consists essentially of" (e.g., "consist essentially of", "consisting essentially of", etc.) and/or "consists of" (e.g., "consist of", "consisting of", etc.).

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention (s) set forth herein.

The invention claimed is:

1. A golf ball comprising a core and a cover, wherein the core is formed from a polymer composition comprising delignified natural wood, wherein:
   the polymer composition is selected from polybutadiene rubber, styrene-butadiene rubber, and blends thereof;
   the delignified natural wood is selected from basswoods, oaks, poplars, ashes, alders, aspens, balsa woods, beeches, birches, cherries, butternuts, chestnuts, cocobolos, elms, hickories, maples, oaks, padauks, plums, walnuts, willows, yellow poplars, bald cypresses, cedars, cypresses, firs, hemlocks, larches, pines, redwoods, spruces, tamaracks, junipers, yews, bamboo, and combinations thereof; and
   the delignified natural wood has a lignin content of less than 20 wt % and a hemicellulose content of 15 wt % or less.

2. The golf ball of claim 1, wherein the lignin content of the delignified natural wood is 15 wt % or less.

3. The golf ball of claim 1, wherein the delignified natural wood is a powder.

4. The golf ball of claim 1, wherein the delignified natural wood is included in the polymer composition in an amount of 20 wt % or less, based on the total weight of the polymer composition.

* * * * *